United States Patent
Carwana et al.

(10) Patent No.: US 8,594,256 B2
(45) Date of Patent: Nov. 26, 2013

(54) LOW POWER, MULTI-CHIP DIVERSITY ARCHITECTURE

(75) Inventors: James Carwana, Aliso Viejo, CA (US);
Chaoliang T. Chen, Irvine, CA (US);
Tracy Denk, Aliso Viejo, CA (US)

(73) Assignee: Newport Media, Inc., Lake Forest, CA (US)

( * ) Notice: Subject to any disclaimer, the term of this patent is extended or adjusted under 35 U.S.C. 154(b) by 406 days.

(21) Appl. No.: 12/882,174

(22) Filed: Sep. 14, 2010

(65) Prior Publication Data
US 2012/0063553 A1 Mar. 15, 2012

(51) Int. Cl.
*H04B 7/10* (2006.01)
*H04L 1/02* (2006.01)

(52) U.S. Cl.
USPC ............................ 375/347; 375/267; 375/339

(58) Field of Classification Search
USPC .......................................... 375/347, 339, 267
See application file for complete search history.

(56) References Cited

U.S. PATENT DOCUMENTS

| | | | | |
|---|---|---|---|---|
| 4,644,529 A | * | 2/1987 | Amstutz et al. | 370/422 |
| 2006/0270372 A1 | * | 11/2006 | Bisanti et al. | 455/260 |
| 2010/0035570 A1 | * | 2/2010 | Tsukio et al. | 455/254 |
| 2010/0323648 A1 | * | 12/2010 | Takano et al. | 455/150.1 |

* cited by examiner

*Primary Examiner* — Qutbuddin Ghulamali
(74) *Attorney, Agent, or Firm* — Rahman LLC

(57) ABSTRACT

A multi-chip antenna diversity architecture includes a first receiver chip including a first tuner, and a first demodulator directly connected to the tuner. The first demodulator demodulates the first input signal received from the first tuner. A first power sequencer that controls the first receiver chip, and a first chip ID including a voltage source $V_{SS}$ that indicates the first receiver chip as a slave chip. A second receiver chip includes a second tuner, and a second demodulator directly connected to the second tuner. The second demodulator demodulates the second input signal received from the second tuner. A second diversity combiner directly connected to the second demodulator. A second chip ID includes a voltage source $V_{DD}$ that indicates the second receiver chip as a master chip. A Diversity State Machine (DSM) controls an operating state of the first receiver chip and the second receiver chip that are structurally identical.

20 Claims, 7 Drawing Sheets

LOW POWER, MULTI-CHIP DIVERSITY ARCHITECTURE

BACKGROUND

1. Technical Field

The embodiments herein generally relate to a multi-chip antenna diversity architecture, and, more particularly, to an optimized antenna diversity and power consumption architecture based on channel conditions.

2. Description of the Related Art

Mobile television receivers can be integrated with a variety of devices ranging from low cost low performance products to high cost high performance products to achieve the benefits of antenna diversity. It is possible to design a single chip product to address both ends of the market by creating a multi-chip diversity solution to produce error free audio/video. For the low-performance market a single receiver can be used. For the high-performance market multiple receivers can be tied together to achieve the performance benefits associated with antenna diversity.

For optimizing the performance of mobile television receivers, multiple receiver chips are tied together in order to obtain better performance associated with antenna diversity. In a traditional multi-chip diversity architecture, both receiver chips are kept powered on all the time in order to protect against degrading channel conditions in an effort to receive error free audio/video. This leads to double power consumption even in good channel conditions though the diversity architecture is not providing superior quality audio/video data.

FIG. 1 illustrates a block diagram of a traditional multi-chip architecture 100 where receiver chips 104A-B are tied together to achieve the benefits of antenna diversity. The mobile television receiver architecture 100 includes antennas 102A-B, and receiver chips 104A-B. The receiver chips 104A-B include a tuner 106A-106B and a demodulator 108A-B. The receiver chip 104A receives the signal input of varying range from the antenna 102A.

The received signal is then sent into the receiver block 104A. The tuner 106A in the receiver chip 104A is used to amplify the signal for further processing and finally the demodulator 108A decodes the signal into an error free audio/video.

The receiver chip 104A transmits the diversity data to the receiver chip 104B to improve the quality of the audio/video signal. In favorable channel conditions, receiver chip 104A is capable of processing the received signal to generate an error free audio/video data. But the received signal is sent to the receiver chip 104B. Thus, in favorable channel conditions there is double power consumption by the architecture 100. Therefore, there remains a need of a multi chip antenna diversity architecture that optimizes diversity as well as power consumption.

SUMMARY

In view of the foregoing, an embodiment herein provides a multi-chip antenna diversity architecture that includes a first receiver chip that receives a first input signal from a first antenna. The first receiver chip includes a first tuner that amplifies the first input signal, a first demodulator directly connected to the tuner. The first demodulator demodulates the first input signal received from the first tuner. A first power sequencer that controls the first receiver chip, and a first chip ID including a voltage source $V_{SS}$ that indicates the first receiver chip as a slave chip. A second receiver chip that receives a second input signal from a second antenna. The second receiver chip includes a second tuner that amplifies the second input signal, a second demodulator directly connected to the second tuner. The second demodulator demodulates the second input signal received from the second tuner. A second diversity combiner directly connected to the second demodulator. The second diversity combiner receives diversity data from the first demodulator. A second chip ID including a voltage source $V_{DD}$ that indicates the second receiver chip as a master chip, and a Diversity State Machine (DSM) that receives signal statistics from the first demodulator and the second demodulator. The DSM controls an operating state of the first receiver chip and the second receiver chip. The first receiver chip and the second receiver chip are structurally identical.

The DSM transmits a command to the Slave chip to power down using a general purpose input-output switch (GPIOX) available on the first receiver chip and the second receiver chip. The slave chip is powered ON upon the GPIOX being set to VDD. The slave chip is powered OFF upon the GPIOX being set to VSS. The DSM automatically power downs either the master chip or the slave chip depending upon channel conditions. The first demodulator transmits diversity data and signal statistics to the second receiver chip.

In another aspect, a multi-chip antenna diversity architecture that optimizes power consumption based on channel conditions is provided. The multi-chip antenna diversity architecture includes a first receiver chip that receives a first input signal from a first antenna. The first receiver chip includes a first clock phase lock loop (PLL) that generates a first digital clock, a first crystal oscillator operatively connected to the first clock PLL, a first tuner that amplifies the first input signal, a first demodulator operatively connected to the first tuner. The first demodulator demodulates the first input signal received from the first tuner. A first maximum ratio combiner (MRC) operatively connected to the first demodulator, a first power sequencer that controls the first receiver chip, and a first Diversity State Machine (DSM) operatively connected to the first power sequencer.

The multi-chip antenna diversity architecture further includes a second receiver chip that receives a second input signal from a second antenna. The second receiver chip includes a second clock PLL that generates a second digital clock, a second crystal oscillator operatively connected to the second clock PLL, a second tuner that amplifies the second input signal, a second demodulator operatively connected to the second tuner. The second demodulator demodulates the second input signal received from the second tuner. A second MRC operatively connected to the second demodulator, a second power sequencer, and a second DSM operatively connected to the second power sequencer. The first receiver chip or the second receiver chip transitions a power state based on a value of at least one channel metric, and the second MRC and the second crystal oscillator are disabled.

The first receiver chip or the second receiver chip is powered OFF when the value of the channel metric exceeds a predetermined threshold value. The first DSM powers down any of the first receiver chip and the receiver chip when the channel conditions allow the first receiver chip or the second receiver to receive audio/video. The first power sequencer, and the first DSM are in an 'Always On' domain. The second power sequencer and the second DSM are in an 'Always On' domain. The second demodulator transmits the second input signal being demodulated to the first MRC and the second MRC. Digital power is removed to eliminate a majority of device leakage power.

The second clock PLL, the second crystal oscillator, the second tuner, the second demodulator, and the second MRC are disabled upon the first receiver chip being powered ON. The first tuner and the first demodulator, the second crystal oscillator and the second MRC are disabled upon the second receiver chip being powered ON, wherein the first MRC is powered ON. The channel metric includes any of a signal-to-noise ratio (SNR), a bit error rate (BER), a packet error rate (PER), and a received signal strength indication (RSSI).

In yet another aspect, a method of operating a multi-chip antenna diversity architecture to optimize antenna diversity and power consumption based on channel conditions is provided. The multi-chip antenna diversity architecture includes a master chip comprising a chip pin operatively connected to VDD. The master chip receives a first input signal from a first antenna. A slave chip that includes a chip pin operatively connected to VSS. The slave chip receives a second input signal from a second antenna. The method includes powering ON the master chip and the slave chip when a value of at least one channel metric of the multi-chip antenna diversity architecture is below a threshold value, and powering OFF the master chip or the slave chip when the value of the channel metrics of the multi-chip antenna diversity architecture exceeds the threshold value. Any of the master chip and the slave chip is powered OFF if the channel conditions allow for at least one of the master chip and the slave chip to receive error free audio/video data. The channel conditions comprise any of the SNR, a bit error rate (BER), a packet error rate (PER), and a received signal strength indication (RSSI). A Diversity State Machine (DSM) is used to automatically power down any of the master chip and the slave chip.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
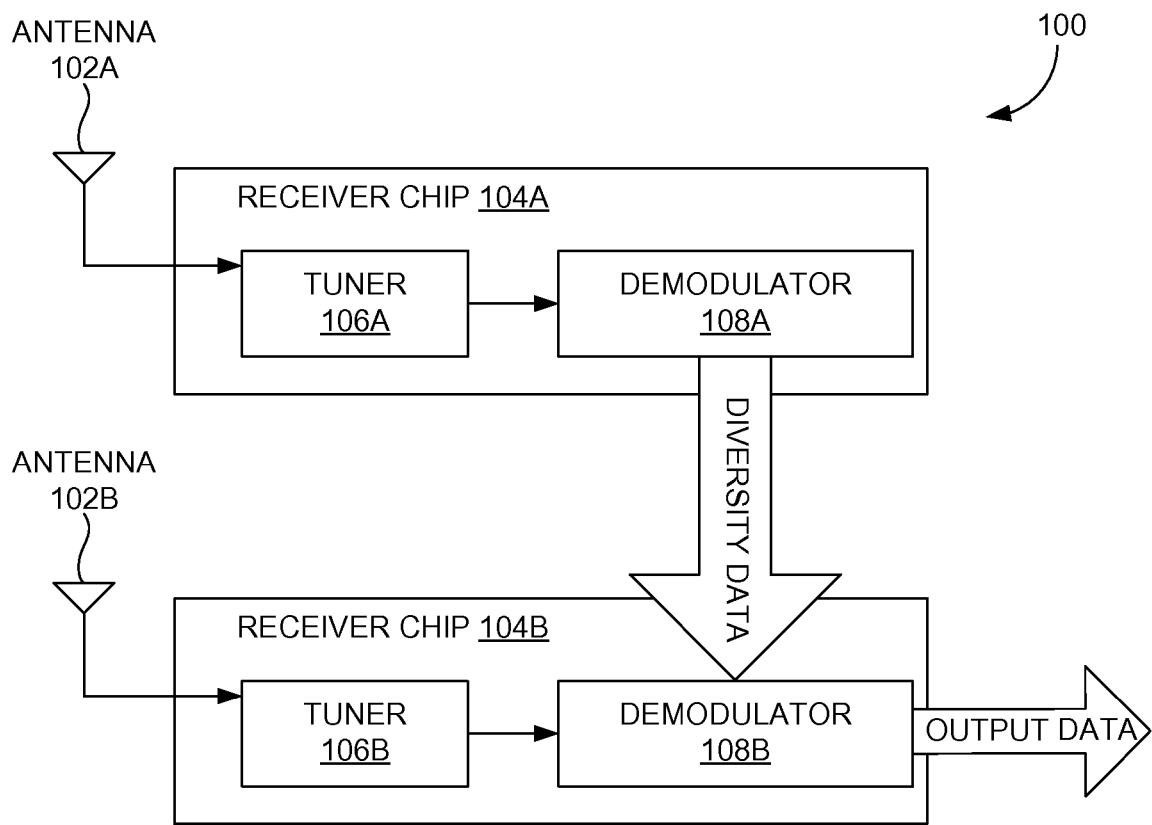
FIG. 1 illustrates a block diagram of a traditional multi-chip architecture where receiver chips are tied together to achieve the benefits of antenna diversity.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

The embodiments herein provide an architecture which selectively shuts down an individual chip in favorable channel conditions to save power. The embodiments herein achieve this by providing a Diversity State Machine (DSM) which automatically powers down either the master receiver or the slave receiver in a multi-chip diversity architecture depending upon the channel conditions to receive audio/video without errors. All transitions are completely controlled by circuits inside the chip, therefore intervention of any external processor is not required. The audio/video data is always emitted from a master chip. Also switching from diversity to a single chip configuration is seamless. There are no audio/video glitches when a chip or another is powered on or off. Referring now to the drawings, and more particularly to FIGS. 2 through 8, where similar reference characters denote corresponding features consistently throughout the figures, there are shown preferred embodiments.

Figure 2:
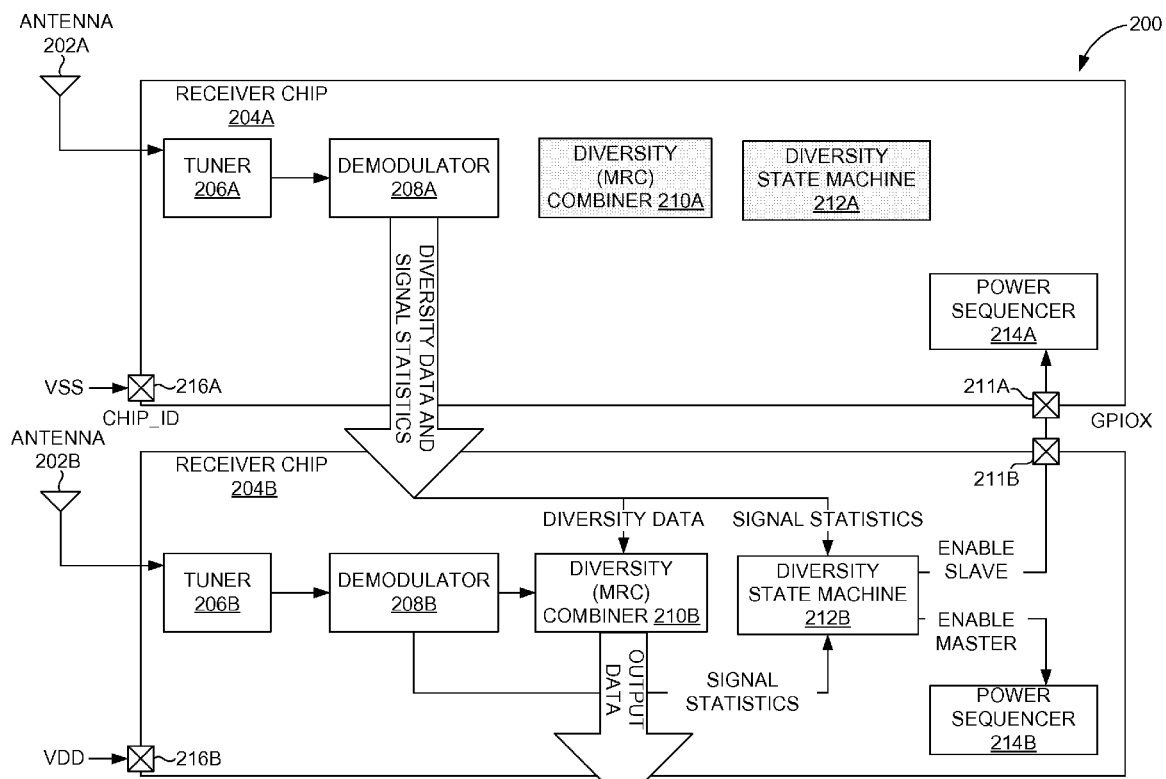
FIG. 2 illustrates a block diagram of a multi-chip antenna diversity architecture according to an embodiment herein.

FIG. 2 illustrates a block diagram of a multi-chip antenna diversity architecture 200 according to an embodiment herein. The multi-chip antenna diversity architecture includes antennas 202A-B and receiver chips 204A-B. The receiver chips 204A-B receive input signals from the antenna 202A-B. In one embodiment, the receiver chip 204A receives the input signal from the antenna 202A. In another embodiment, the receiver chip 204B receives the input signal from the antenna 202B.

The receiver chip 204A includes a tuner 206A, a demodulator 208A, a diversity (Maximum Ratio Combiner (MRC)) combiner 210A, a Diversity State Machine (DSM) 212A, a power sequencer 214A, and a chip_ID 216A. The receiver chip 204B includes a tuner 206B, a demodulator 208B, a diversity (MRC) combiner 210B, a Diversity State Machine (DSM) 212B, a power sequencer 214B, and a chip_ID 216B. The chip_ID 216A of the receiver chip 204A is tied to $V_{SS}$ and indicates that the receiver chip 204A is a slave chip. The chip_ID 216B when tied to $V_{DD}$ indicates that the receiver chip 204B is a master chip. In one embodiment, the receiver chip 204A is referred to as the slave chip and the receiver chip 204B is referred to as the master chip.

The tuner 206A amplifies the input signal received from the antenna 202A. Similarly, the tuner 206B amplifies the input signal received from the antenna 202B and transmits the amplified input signal to the demodulator 208B. The demodulator 208A receives the amplified input signal from the tuner 206A and demodulates the amplified input signal. The demodulator 208A transmits diversity data and corresponding signal statistics to the receiver chip 204B (the master chip 204B). The MRC combiner 210B receives the diversity data from the demodulator 208A and the demodulated input signal from the demodulator 208B.

The MRC combiner 210B combines the data from both demodulators and transmits the output data. In one embodiment, the output data may be audio/video data. In another embodiment, the output data comprises error free audio/video data. The demodulator 208B transmits signal statistics to the DSM 212B. The DSM 212B additionally receives signal statistics from the demodulator 208A. The DSM 212B of the master chip 204A controls the slave chip 204A and the master chip 204B.

In one embodiment, the DSM 212B determines if the channel conditions are adequate to receive audio/video without errors based on channel conditions. In another embodiment, the channel conditions are the signal statistics. In yet another embodiment, the DSM 212B sends signals to power sequencers 214A-B instructing the power sequencers to power ON/OFF the slave chip 204A and the master chip 204B based on the channel conditions such as Signal-to-Noise Ratio (SNR), Bit Error Rate (BER), Packet Error Rate (PER), and a Received Signal Strength Indication (RSSI). If the conditions degrade, the DSM 212B automatically powers ON both the receiver chips 204A-B to receive the benefits of antenna diversity. Thus, the DSM 212B will put the receiver chips 204A and 204B in three different operating states. In a first state both the master chip 204B and the slave chip 204A are powered ON, in a second state only the master chip 204B is powered ON, and in a third state, only the slave chip 204A is powered ON. Even when a receiver is powered OFF there is a small portion of digital logic in the 'Always On' domain which is used to maintain device state and be prepared to turn on the receiver in the event that signal conditions degrade. The 'Always On' domain includes the Power Sequencer (214A-B) and the Diversity State Machine (212A-B).

The DSM 212B in the receiver chip 204B controls the power switching of receiver chips 204A-B based on the channel conditions using the power sequencers 214A-B. In one embodiment, the power sequencers 214A-B control the power ON and OFF of the receiver chip 204A-B as determined by DSM 212B. The DSM 212B in the master chip 204B transmits a command to the slave chip 204A to power ON or OFF using a General Purpose Input-Output (GPIO) switch 211A-B available in the receiver chips 204A-B. The GPIO switch 211A-B provides an interface between the master chip 204B and the slave chip 204A.

In an example embodiment, the GPIO is referred to as GPIOX. In one embodiment, when GPIOX 211A-B is set to $V_{DD}$, then the slave chip 204A is powered ON. In another embodiment, when GPIOX 211A-B is set to $V_{SS}$, then the slave chip 204A is powered OFF. In yet another embodiment, a bi-directional transmission between the master chip 204B and the slave chip 204A may be performed. The digital power is removed to eliminate the majority of CMOS leakage power. However, the DSM 212A-B is powered ON to maintain an operating state by providing a power domain. The slave chip demodulator 208A demodulates the incoming signal before it is sent to the master chip 204B. The diversity combiner 210A and the DSM 212A are physically on the slave chip 204A because the master and slave chips 204A-B are identical. However, diversity combiner 210A and DSM 212A are not functional on the slave chip 204A.

Figure 3A:
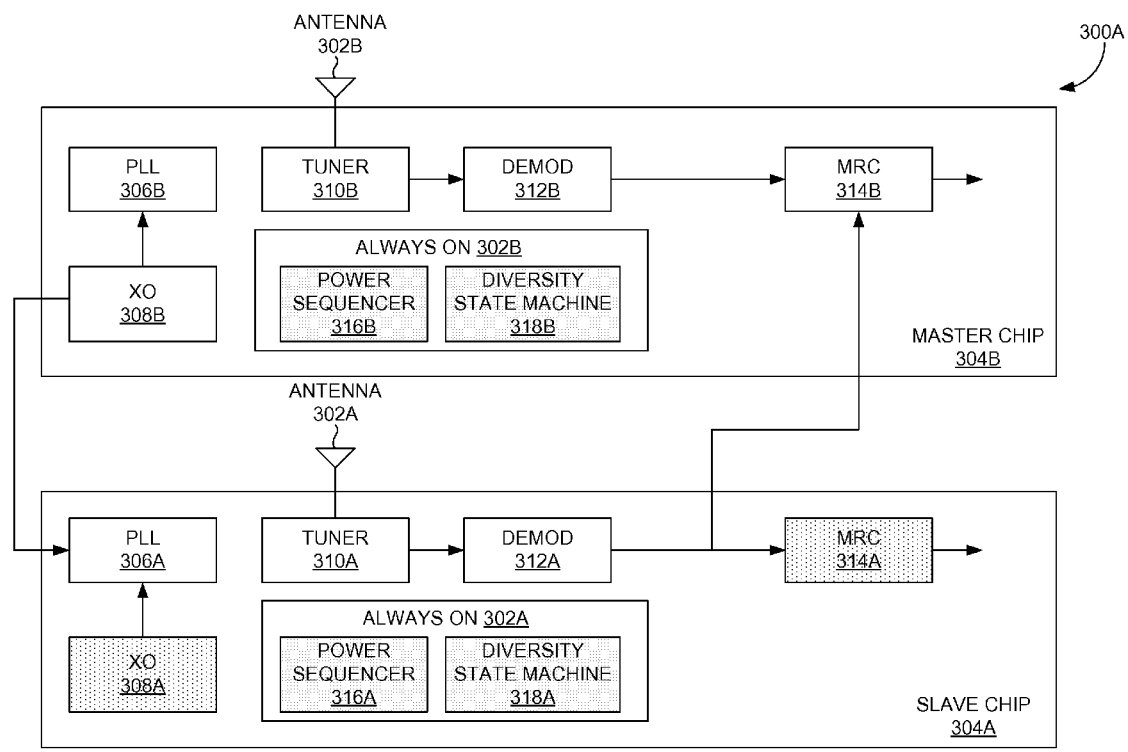
FIG. 3A illustrates a block diagram of a multi-chip antenna diversity architecture when both a master chip and a slave chip are powered ON according to a first embodiment herein.

FIG. 3A illustrates a block diagram of multi-chip antenna diversity architecture 300A when both a master chip 304B and a slave chip 304A are powered ON according to a first embodiment herein. The multi-chip antenna diversity architecture 300A includes the slave chip 304A and master chip 304B. The slave chip 304A includes an antenna 302A, a clock PLL 306A, a crystal oscillator 308A, a tuner 310A, a demodulator 312A, a MRC 314A, a power sequencer 316A, and a Diversity State Machine 318A. Similarly, the master chip 304B includes an antenna 302B, a clock phase lock loop (PLL) 306B, a crystal oscillator 308B, a tuner 310B, a demodulator 312B, a MRC 314B, a power sequencer 316B, and a Diversity State Machine 318B.

The master chip 304B receives an input signal from the antenna 302B. Similarly, the slave chip 304A receives an input signal from the antenna 302A. The clock PLL 306A-B generates digital clock signals from an input signal received. The output from crystal oscillator 308B of the master chip 304B is sent to the clock PLL 306A of the slave chip 304A in order to maintain frequency synchronization of both the master chip 304B and the slave chip 304A. In one embodiment, when both the master chip 304B and the slave chip 304A are powered ON, then the clock PLL 306B, the crystal oscillator 308B, the power sequencer 316A-B, and the DSM 318A-B are powered ON. In another embodiment, the functions of the crystal oscillator 308A, and the MRC 314A are disabled or powered OFF as shown in FIG. 3A. The output from the demodulator 312A-B is transmitted to the MRC 314B.

Figure 3B:
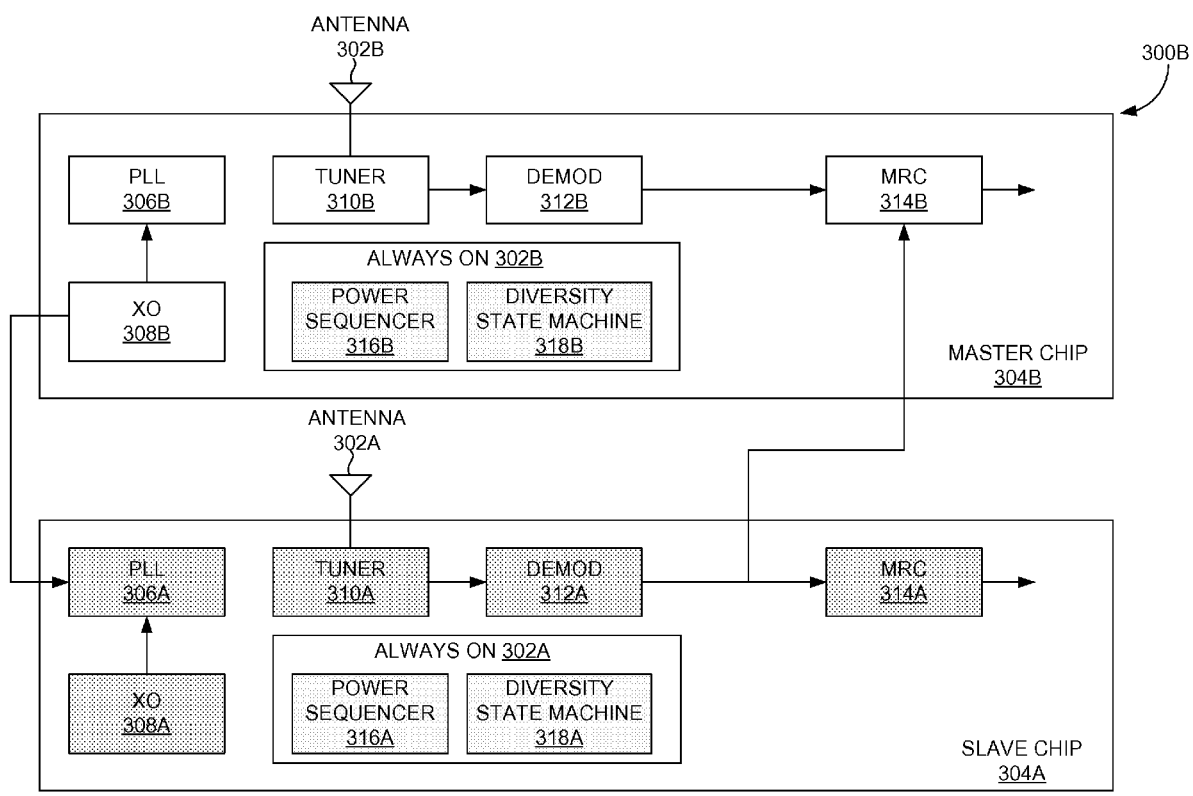
FIG. 3B illustrates the block diagram of the multi-chip antenna diversity architecture when only the master chip is powered ON according to a second embodiment herein.

With reference to FIG. 3A, FIG. 3B illustrates the block diagram of the multi-chip antenna diversity architecture 300B when only the master chip 304B is powered ON according to a second embodiment herein. In one embodiment, when only the master chip 304B is powered ON, then the clock PLL 306B, the crystal oscillator 308B, the power sequencer 316A-B, and the Diversity State Machine 318A-B are powered ON. In another embodiment, the functions of the clock PLL 306A, the crystal oscillator 308A, the tuner 310A, the demodulator 312A, and the MRC 314A are disabled or powered OFF as shown in FIG. 3B. The tuner 310B, the demodulator 312B, and the MRC 314B are active.

Figure 3C:
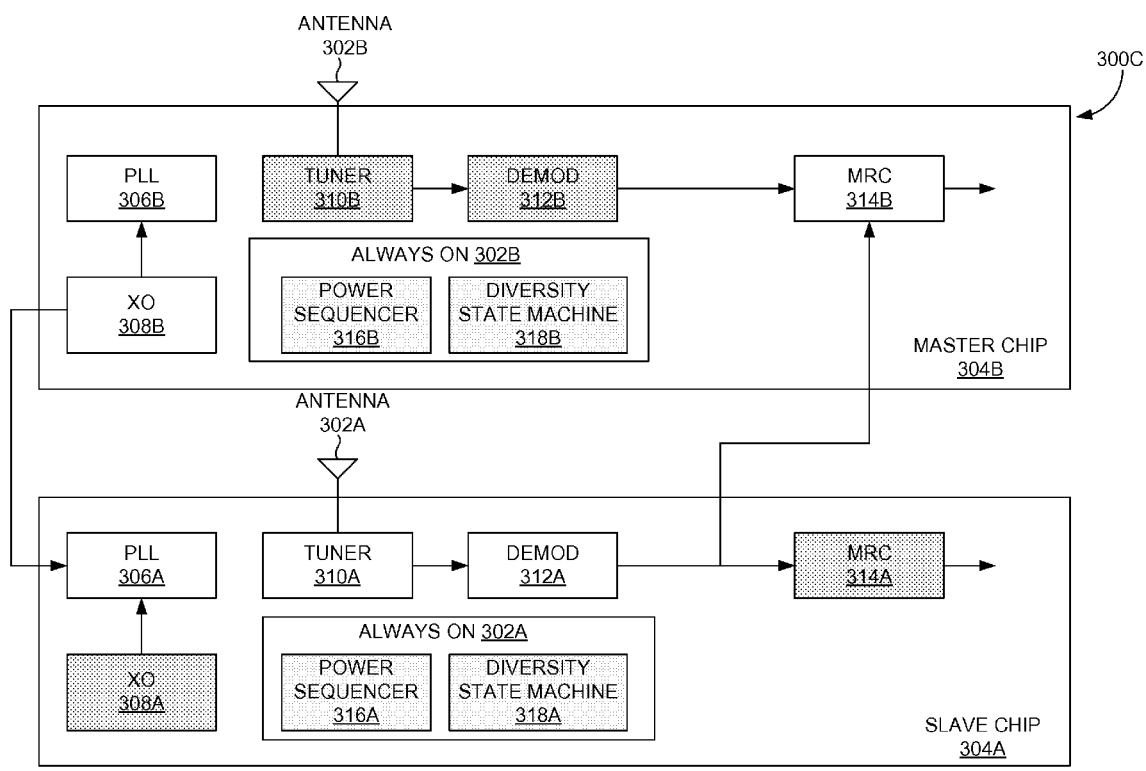
FIG. 3C illustrates the block diagram of the multi-chip antenna diversity architecture when only the slave chip is powered ON according to a third embodiment herein.

With reference to FIG. 3A through FIG. 3B, FIG. 3C illustrates the block diagram of the multi-chip antenna diversity architecture 300C when only the slave chip 304A is powered ON according to a third embodiment herein. In one embodiment, when only the slave chip 304A is powered ON, then the clock PLL 306A, the crystal oscillator 308A, the power sequencer 316A-B, the MRC 314A, and the Diversity State Machine 318A-B are powered ON. In another embodiment, the functions of the crystal oscillator 308A, and the MRC 314A are disabled or powered OFF as shown in FIG. 3C. The MRC 314B, the clock PLL 306A, the tuner 310A, and the demodulator 312A are active.

If the channel conditions are adequate for a single chip (e.g., the master chip 304B, or the slave chip 304A) to receive error free audio/video data, then the DSM 318B powers down either the master chip 304B or the slave chip 304A. This occurs to allow the final audio/video data to always be transmitted from the master chip 304B. The DSM 318B determines the receiver chip (e.g., the master chip 304B, or the slave chip 304A) to power down based on channel conditions (e.g., or channel metrics). The channel metric may be one or more of a Signal-to-Noise Ratio (SNR), a Bit Error Rate (BER), a Packet Error Rate (PER), and a Received Signal Strength Indication (RSSI).

Figures 4, 5, 6, 7:
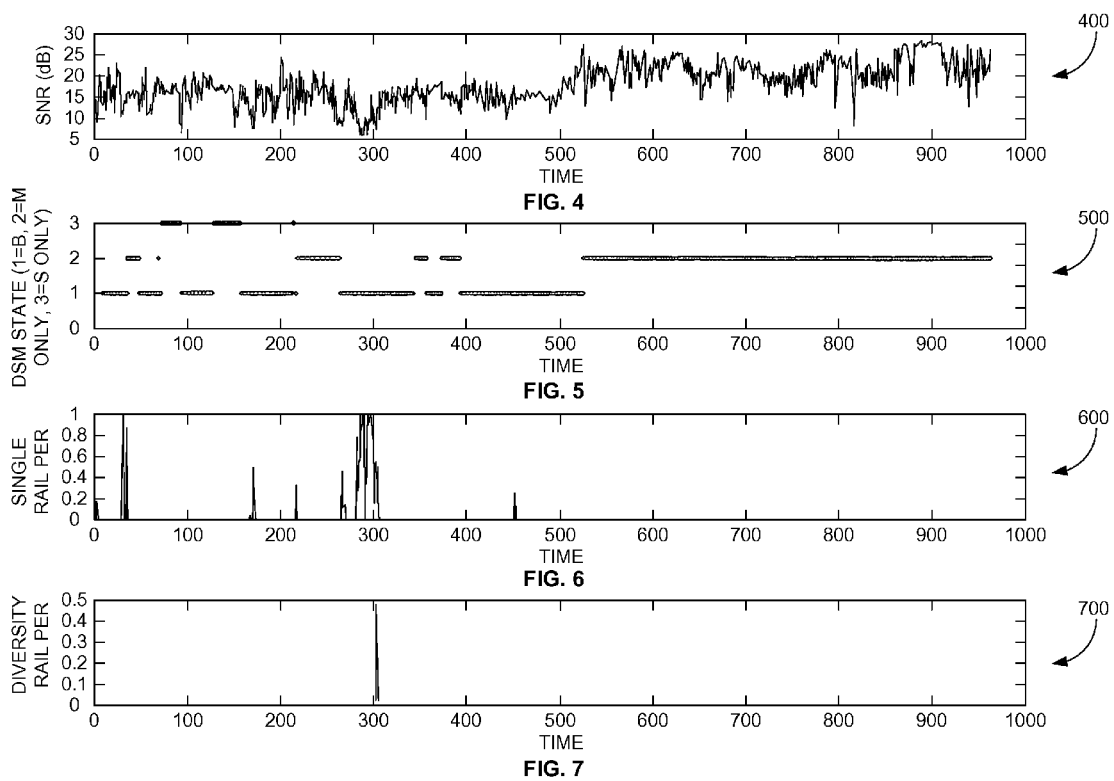
FIG. 4 illustrates a graphical representation of a received Signal-to-Noise Ratio (SNR) being operated by the DSM of FIGS. 3A through 3C, over a period of time according to an embodiment herein.
FIG. 5 illustrates a graphical representation of the operating states of the DSM of FIGS. 3A through 3C according to an embodiment herein.
FIG. 6 illustrates a graphical representation of a Packet Error Rate (PER) for a single chip according to an embodiment herein.
FIG. 7 illustrates a graphical representation of a Packet Error Rate (PER) after MRC combining according to an embodiment herein.

FIG. 4 illustrates a graphical representation 400 of the received Signal-to-Noise Ratio (SNR) while the receiver chips are operated by the DSM 318B of FIG. 3A according to a first embodiment herein. The SNR is plotted on the y-axis over a period of time plotted on the x-axis. With reference to FIG. 4, FIG. 5 illustrates a graphical representation 500 of the operating states (OS) of the DSM 318B of FIG. 3A according to an embodiment herein. The operating state of the DSM 318B is plotted on the y-axis and the time period is plotted on x-axis. In an example embodiment, the graphical representation of FIG. 5 illustrates when the value of the operating state of the DSM 318B is 1, then both the master chip 304B and the slave chip 304A are powered ON.

In one example embodiment, both the master chip 304B and the slave chip 304A are powered ON if a value of the channel metrics is below a threshold value. In another example embodiment, when the value of the operating state of the DSM 318B is 2, then only the master chip 304B is powered ON and the slave chip 304A is powered OFF. In yet another example embodiment, when the value of the operating state of the DSM 318B is 3, then the master chip 304B is powered OFF and the slave chip 304A is powered ON. In one example, either the master chip 304B or the slave chip 304A is powered OFF if the value of the channel metric exceeds the threshold value. In one embodiment, the master chip 304B or the slave chip 304A is powered OFF when the value of the channel metric exceeds a predetermined threshold value. The master chip 304B or the slave chip 304A is powered OFF if the channel conditions are adequate for at least one of the master chip 304B or the slave chip 304A to receive an error free audio/video data.

FIG. 4 illustrates a graphical representation of a received Signal-to-Noise Ratio (SNR) being operated by the DSM of FIGS. 3A through 3C, over a period of time according to an embodiment herein. Between time period starting from t=220 to t=270, the DSM state is recorded as 2 which implies only the master chip is powered ON due to a higher SNR in the corresponding time interval. Time period starting from t=400 to t=510, a low SNR as depicted in FIG. 4, the operating state of the DSM is recorded as 1. After time t=540, the operating state of the DSM is recorded as 2 which implies only the master chip is powered ON and the signal quality improves corresponding to a higher SNR as depicted in the FIG. 4.

With reference to FIG. 4 and FIG. 5, FIG. 6 illustrates a graphical representation 600 of a Packet Error Rate (PER) for a single chip according to an embodiment herein. Packet Error Rate tests the performance of the receiver chip receiving signals from the antenna. With reference to FIG. 4 through FIG. 6, FIG. 7 illustrates a graphical representation 700 of a PER after MRC combining according to an embodiment herein. The signals received from the antenna are combined and received by the receiver chip to reduce the PER after the MRC combining.

Figure 8:
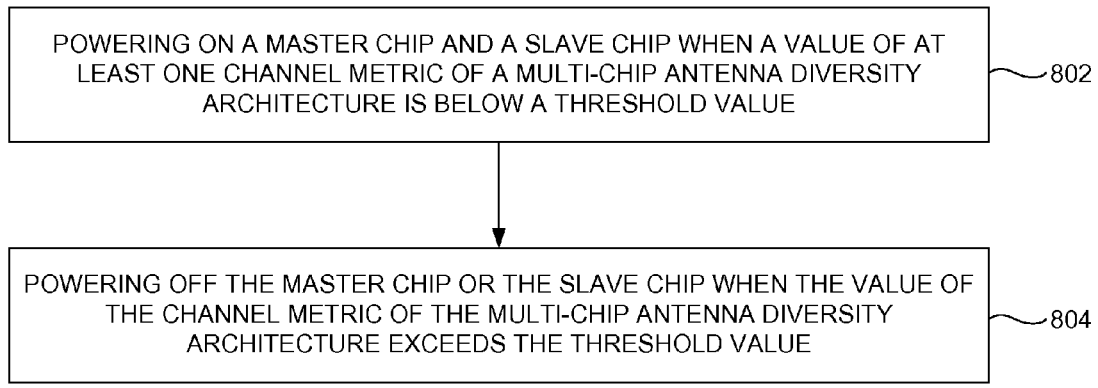
FIG. 8 is a flow diagram illustrating a method according to an embodiment herein.

FIG. 8, with reference to FIGS. 2 through 7, is a flow diagram illustrating a method of operating a multi-chip antenna diversity architecture 200 of FIG. 2 to optimize antenna diversity and power consumption based on channel conditions according to an embodiment herein. The multi-chip antenna diversity architecture 200 includes a master chip 204B that includes a chip pin operatively connected to $V_{DD}$. The master chip 204B receives a first input signal from a first antenna. A slave chip 204A that includes a chip pin operatively connected to $V_{SS}$. The slave chip 204A receives a second input signal from a second antenna. In step 802, the master chip 204B and the slave chip 204A are powered ON when a value of at least one channel metric of the multi-chip antenna diversity architecture 200 is below a threshold value. In step 804, the master chip 204B or the slave chip 204A is powered OFF when the value of the channel metrics of the multi-chip antenna diversity architecture 200 exceeds the threshold value.

The master chip 204B or the slave chip 204A is powered OFF if the channel conditions allow for at least one of the master chip 204B and the slave chip 204A to receive error free audio/video data. The channel conditions may be any of the SNR, a bit error rate (BER), a packet error rate (PER), and a received signal strength indication (RSSI). A Diversity State Machine (DSM) may be used to automatically power down the master chip 204B or the slave chip 204A.

In the multi-chip diversity architecture 300A-300C, antenna diversity and power consumption are optimized based on the quality of signal. Powering OFF any of the master chip 304B or the slave chip 304A is based on channel conditions. The DSM 318B of the multi-chip diversity architecture 300A-300C controls the transitions, thus eliminating a need of an external processor. The audio/video data is always transmitted from the master chip 304B. There are no audio/video glitches when any of the chips (e.g., the master chip 304B, or the slave chip 304A) is powered ON/OFF. In addition, the communication between the master chip 304B and the slave chip 304A may be bi-directional. The output from the crystal oscillator 308B of the master chip 304B is transmitted to the slave chip 304A such that the digital clocks of both the chips (the master chip 304B and the slave chip 304A) are frequency synchronized. Further, digital power is removed to eliminate majority of CMOS leakage power.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A multi-chip antenna diversity architecture that optimizes power consumption based on channel conditions comprising:
    a first receiver chip that receives a first input signal from a first antenna, said first receiver chip comprising:
        a first clock phase lock loop (PLL) that generates a first digital clock;
        a first crystal oscillator operatively connected to said first clock PLL;
        a first tuner that amplifies said first input signal;
        a first demodulator operatively connected to said first tuner, wherein said first demodulator demodulates said first input signal received from said first tuner;
        a first maximum ratio combiner (MRC) operatively connected to said first demodulator;
        a first power sequencer that controls said first receiver chip; and
        a first Diversity State Machine (DSM) operatively connected to said first power sequencer;
    a second receiver chip that receives a second input signal from a second antenna, said second receiver chip comprising:

a second clock PLL that generates a second digital clock;
a second crystal oscillator operatively connected to said second clock PLL;
a second tuner that amplifies said second input signal;
a second demodulator operatively connected to said second tuner, wherein said second demodulator demodulates said second input signal received from said second tuner;
a second MRC operatively connected to said second demodulator;
a second power sequencer; and
a second DSM operatively connected to said second power sequencer,
wherein said first receiver chip or said second receiver chip transitions a power state based on a value of at least one channel metric,
wherein said second MRC and said second crystal oscillator are disabled upon said first receiver chip being powered ON, and
wherein any of said first receiver chip and said second receiver chip is powered OFF when said value of said channel metric exceeds a predetermined threshold value.

2. The multi-chip antenna diversity architecture of claim 1, wherein said first DSM powers down said first receiver chip when said channel conditions allow said first receiver chip to receive audio/video.

3. The multi-chip antenna diversity architecture of claim 2, wherein said audio/video is received error free.

4. The multi-chip antenna diversity architecture of claim 1, wherein said first power sequencer and said first DSM are in an 'Always On' domain.

5. The multi-chip antenna diversity architecture of claim 1, wherein said second power sequencer and said second DSM are in an 'Always On' domain.

6. The multi-chip antenna diversity architecture of claim 1, wherein said second demodulator transmits said second input signal being demodulated to said first MRC and said second MRC.

7. The multi-chip antenna diversity architecture of claim 1, wherein digital power is removed to reduce device leakage power.

8. The multi-chip antenna diversity architecture of claim 1, wherein said second clock PLL, said second tuner, and said second demodulator are disabled upon said first receiver chip being powered ON.

9. The multi-chip antenna diversity architecture of claim 1, wherein said first tuner, said first demodulator, said second crystal oscillator, and said second MRC are disabled upon said second receiver chip being powered ON, and wherein said first MRC is powered ON.

10. The multi-chip antenna diversity architecture of claim 1, wherein said channel metric comprises any of a signal-to-noise ratio (SNR), a bit error rate (BER), a packet error rate (PER), and a received signal strength indication (RSSI).

11. The multi-chip antenna diversity architecture of claim 1, wherein said first DSM powers down said first receiver chip when said channel conditions allow said second receiver to receive audio/video.

12. The multi-chip antenna diversity architecture of claim 11, wherein said audio/video is received error free.

13. The multi-chip antenna diversity architecture of claim 1, wherein said first DSM powers down said second receiver chip when said channel conditions allow said first receiver chip to receive audio/video.

14. The multi-chip antenna diversity architecture of claim 13, wherein said audio/video is received error free.

15. The multi-chip antenna diversity architecture of claim 1, wherein said first DSM powers down said second receiver chip when said channel conditions allow said second receiver to receive audio/video.

16. The multi-chip antenna diversity architecture of claim 15, wherein said audio/video is received error free.

17. A multi-chip antenna diversity architecture that optimizes power consumption based on channel conditions comprising:
a first receiver chip that receives a first input signal from a first antenna, said first receiver chip comprising:
a first clock phase lock loop (PLL) that generates a first digital clock;
a first crystal oscillator operatively connected to said first clock PLL;
a first tuner that amplifies said first input signal;
a first demodulator operatively connected to said first tuner, wherein said first demodulator demodulates said first input signal received from said first tuner;
a first maximum ratio combiner (MRC) operatively connected to said first demodulator;
a first power sequencer that controls said first receiver chip; and
a first Diversity State Machine (DSM) operatively connected to said first power sequencer;
a second receiver chip that receives a second input signal from a second antenna, said second receiver chip comprising:
a second clock PLL that generates a second digital clock;
a second crystal oscillator operatively connected to said second clock PLL;
a second tuner that amplifies said second input signal;
a second demodulator operatively connected to said second tuner, wherein said second demodulator demodulates said second input signal received from said second tuner;
a second MRC operatively connected to said second demodulator;
a second power sequencer; and
a second DSM operatively connected to said second power sequencer,
wherein said first receiver chip or said second receiver chip transitions a power state based on a value of at least one channel metric,
wherein said second MRC and said second crystal oscillator are disabled upon said second receiver chip being powered ON, and
wherein any of said first receiver chip and said second receiver chip is powered OFF when said value of said channel metric exceeds a predetermined threshold value.

18. The multi-chip antenna diversity architecture of claim 17, wherein digital power is removed to reduce device leakage power.

19. The multi-chip antenna diversity architecture of claim 17, wherein said second clock PLL, said second crystal oscillator, said second tuner, said second demodulator, and said second MRC are disabled upon said first receiver chip being powered ON.

20. The multi-chip antenna diversity architecture of claim 17, wherein said first tuner, said first demodulator, said second crystal oscillator, and said second MRC are disabled upon said second receiver chip being powered ON, and wherein said first MRC is powered ON.

* * * * *